United States Patent [19]

Maust, Jr. et al.

[11] 4,304,306

[45] Dec. 8, 1981

[54] IMPLEMENT AND SPRING TINE MOUNTING THEREFORE

[75] Inventors: John E. Maust, Jr., Des Moines; Phillip E. Stevens, Ankeny, both of Iowa

[73] Assignee: Deere & Company, Moline, Ill.

[21] Appl. No.: 112,038

[22] Filed: Jan. 14, 1980

[51] Int. Cl.³ .............................................. A01B 23/02
[52] U.S. Cl. .................................... 172/643; 172/142; 172/707
[58] Field of Search ............... 172/142, 197, 198, 201, 172/202, 203, 643, 707, 712, 618; 56/400, 400.21; 403/113, 117, 291

[56] References Cited

U.S. PATENT DOCUMENTS

| | | | |
|---|---|---|---|
| 1,950,834 | 3/1934 | Wyss | 172/643 |
| 2,990,021 | 6/1961 | Johnson et al. | 172/643 X |
| 3,016,958 | 1/1962 | Knapp et al. | 172/643 X |
| 3,049,184 | 8/1962 | Lohrman | 172/707 |

OTHER PUBLICATIONS

"Brady 350 Tine Harrow for Field Cultivator Specifications", Koehring Farm Division, Appleton, Wis. 1977.

"Wil-Rich Mounted Coil Tooth Harrows", Wil-Rich Inc, Wahpeton, N.D., Sep. 26, 1978.

Primary Examiner—Richard T. Stouffer

[57] ABSTRACT

A double-coil spring tine is pivotally attached to a channel-shaped mounting bar of a harrow unit by a removable bracket. The portion of the tine connecting the coils is held loosely next to the mounting bar by the bracket so that the entire tine can pivot about the axis of the attaching portion. The portion of the tine on either side of the bracket is placed in tension rather than subjected to bending. Tines are individually replaceable without need to disassemble the mounting bar.

6 Claims, 4 Drawing Figures

IMPLEMENT AND SPRING TINE MOUNTING THEREFORE

BACKGROUND OF THE INVENTION

The present invention relates broadly to a harrow and more specifically to means for attaching a spring tine to the mounting bar of a harrow.

A primary problem in the design of a harrow attachment or similar implement utilizing a spring tooth tine is that stresses near the point of connection of the tine to the mounting bar result in premature breakage of the tine. The tine must be able to adequately flex when pulled forwardly through the soil. Also, to prevent excess stresses in the tine, it must be able to pivot or swing forwardly about a generally transverse, horizontal axis when the harrow is reversed. The tines often break when the harrow is reversed while the tines are still engaging the ground.

When the tines strike an object and flex rearwardly, they tend to spring forwardly with a considerable amount of force as the object is cleared. This recoiling action can cause excess vibration and stresses in the tine, particularly near the mounting.

Previous means for mounting double-coil spring tines such as described in U.S. Pat. Nos. 3,049,184 and 3,016,958 have not been entirely satisfactory since the tines have a tendency to break near the points of connection to the tooth bars because of the bending loads there. The tine pairs are not freely pivotable in the forward direction as the implement is moved rearwardly. If the tines are in contact with the ground or strike a bank of dirt or other obstacles while the implement is being moved rearwardly, the tines can break. When the tines strike an object and flex rearwardly during a tilling operation, they tend to recoil after the object is passed, providing additional stresses near the connection points as the tines rebound forwardly passed the working position.

Freely pivoting tines which overcome some of the above problems are available on a few harrows which use a circular mounting bar. The double-coils are wrapped around the bars, and a pair of stops located on the bar between each pair of coils contact the portion of the tine joining the coils to hold the tine in the working position as the unit moves forwardly. When the implement is reversed, the tine rotates about the bar allowing the soil contacting teeth to swing forwardly and up from the working position. This type of tine, however, is difficult to mount or replace. The tines have to be mounted in order as the bar is assembled onto the support arms of the implement. If a center tine breaks, all the tines up to and including the broken one have to be slipped off the bar before a new one can be mounted. Often the pair of stops for each tine must be removed also. Therefore, replacement of the tines is very time-consuming.

BRIEF SUMMARY OF THE INVENTION

It is therefore an object of the present invention to provide an improved spring tine mounting for a harrow.

It is another object of this invention to provide an improved spring tine mounting which reduces tooth breakage and which allows the tine to be easily replaced.

It is yet another object to provide a double-coil spring tine mounting means for an implement which allows the tine to pivot forwardly about the axis of the coil connecting portion when the implement is moved rearwardly while in contact with the soil. It is another object to provide such a mounting which does not require that the coils embrace the mounting bar.

It is a further object to provide a spring tine mounting means for a tillage implement which reduces the bending load of the tine in the area of its connection to the mounting bar, and which maintains the area in true tension rather than bending during operation.

The present invention provides a means for pivotally attaching a double-coil spring tine to a channel-shaped mounting bar of a harrow in which the pivot area of the tine is attached to the bar with a clamp that allows the tine to freely return to the working position after hitting an object or after the implement is reversed and the tine is pivoted upwardly. The attaching section of the tine is placed in tension with the leading portion of each coil pressed against the forward flange of the channel-shaped bar as the tine is urged rearwardly by the soil. The connecting portion of the tine is pulled in the direction of its axis rather than being bent transversely to its axis.

These and other objects, advantages and features of the present invention will become apparent to those skilled in the art after a consideration of the following detailed description, taken in conjunction with the accompanying drawings.

DESCRIPTION OF THE PREFERRED EMBODIMENT

Figure 1:
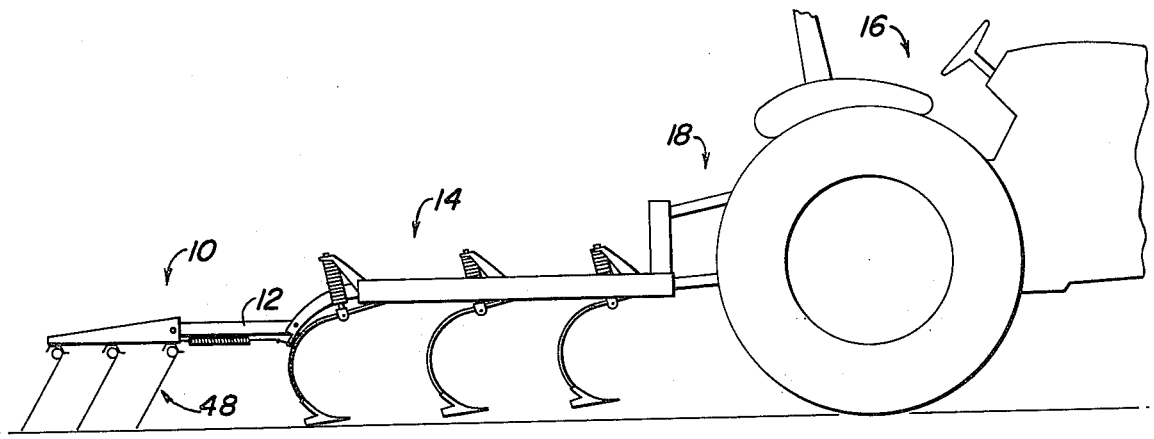
FIG. 1 is a side view of a harrow attachment, utilizing the device of the present invention, connected to a field cultivator.

Referring to FIG. 1, a harrow attachment is indicated by the reference numeral 10 and is connected by draw bars 12 to a rear frame bar of a field cultivator 14. The cultivator 14 is connected to a tractor 16 by a conventional three-point hitch 18.

Figure 2:
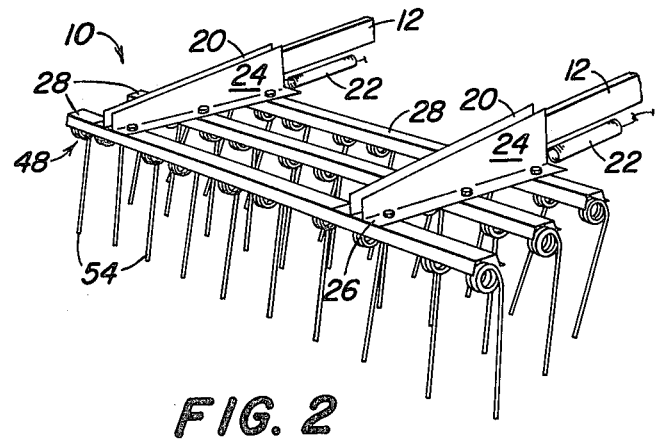
FIG. 2 is a perspective view of the harrow attachment of FIG. 1.

A pair of support arms 20 (FIG. 2) on each harrow attachment 10 are rigidly connected by bolts to the corresponding draw bars 12 and are raised and lowered with the field cultivator 14. A down-pressure spring 22 downwardly biases the arm 12 which is pivotally connected to the frame of the field cultivator 14.

Each support arm 20 includes a pair of side members 24 with an outwardly extending right-angle bend 26 at the bottom of the arm, each with several holes drilled therein. Several channelshaped tine bars 28 are positioned under the support arms 20. Bolt assemblies 30 pass through holes in the tine bars 28 and the bend 26, and lock nuts 32 are tightened on the bolts to secure the tine bars to the support arms 20.

The tine bars 28 include front and rear flanges 38 and 40 and an upper flat portion 42 through which the mounting bolts 30 pass. A forwardly facing lip 44 extends from the front flange 38 the entire length of the tine bar.

Spaced along the tine bar 28 by brackets 46 are double-coil spring tines 48 which include a pair of coiled sections 50 joined by a transverse connecting section 52. The laterally outward ends of the coils 50 terminate in soil working tines or teeth 54. The innermost end of each coil 50 terminates in a forward portion 56 which extends forwardly (FIGS. 3 and 4) to the transverse connecting section 52.

Figure 4:
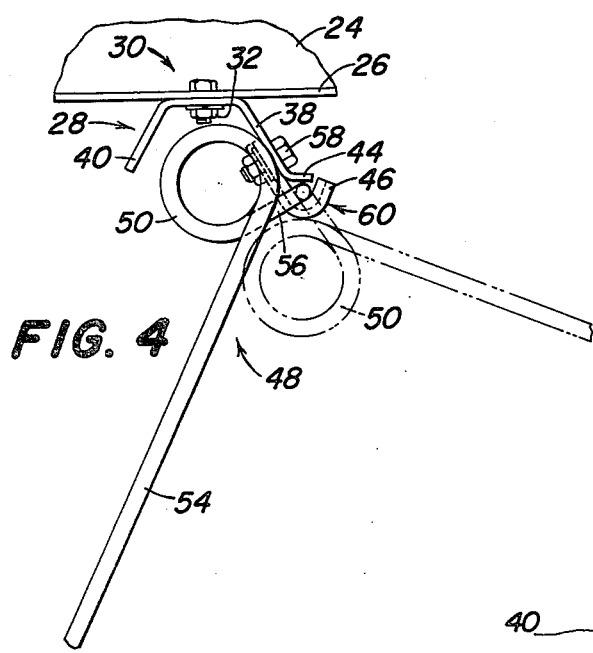
FIG. 4 is a side view of the channel-bar mounting bracket and tine illustrating the tine in the operating position and in the free return position.
Figure 3:
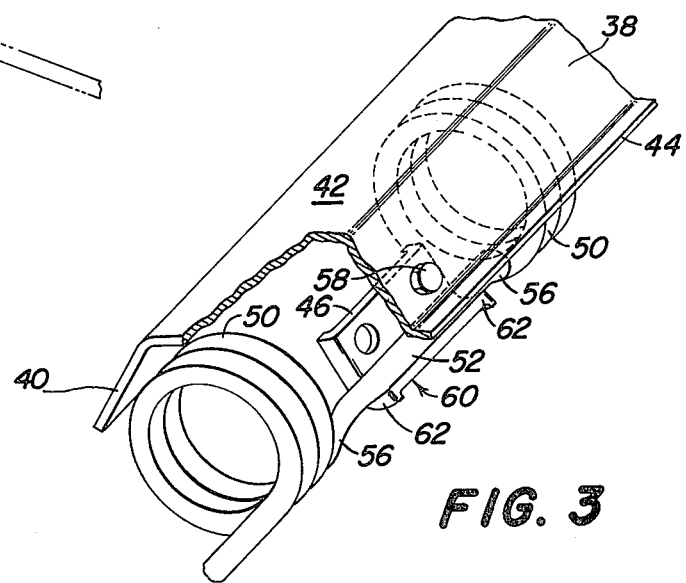
FIG. 3 is a perspective view of a spring tine and a channel bar mounted in accordance with the present invention with parts broken away for clarity.

As best seen in FIGS. 3 and 4, each bracket 46 is secured to the rear of the front flange 38 by two bolts 58. The lower part 60 of the bracket 46 is U-shaped and cooperates with the forwardly facing lip 44 of the tine bars 28 to form a channel through which the connecting portion 52 extends. The lip 44 prevents the spring tine from coming out of the U-shaped part 60 while allowing the entire tine to pivot (FIG. 4) about the axis of the connecting portion 52. The bracket 46 is approximately equal in width to the length of the connecting portion 52 to prevent the tine from shifting laterally. The laterally outward ends 62 of the bracket are flanged to conform to the shape of the tine and reduce wear in the area where the forward portion 56 and the connecting section 52 meet.

In the operating position as shown by the solid lines in FIG. 4, the tine is pivoted about the axis of the portion 52 to the clockwise-most position so the soil working teeth are angled downwardly and rearwardly. The force acting on the teeth as they are pulled forwardly through the soil act to rotate the coils in the clockwise direction, but the forward portions of the coils 50 contact the front flange 38 to prevent further rotation. The lever action provided by the teeth 54 and the coils 50 abutting against the flange 38 put the forward portion 56 of the tine in tension rather than providing a bending moment near the connection to the tine bar. Therefore, stresses are reduced near the points of connection to reduce the incidents of tine breakage. The coils 50 allow the tines to flex sufficiently from the operating position shown in FIG. 4 when large clumps or other obstacles are encountered during tillage. When the teeth 54 spring back after flexing rearwardly, for example after hitting an obstacle, the coils are free to pivot upwardly in the counterclockwise direction about the axis of the portion 52 to dampen the recoil. As the implement moves forwardly and the teeth 52 contact the soil, the entire tine will automatically return to the counterclockwise position assumed upon recoil to the operating position.

If the harrow is reversed while the tines are in contact with the soil, or if the operator backs into a bank or a mound of dirt or the like, the tines will pivot forwardly and upwardly, as shown by the broken lines in FIG. 4, to prevent the tines from stressing and breaking. Thereafter, the tines will freely return to their operating position.

To replace a tine, the two mounting bolts 58 are removed, the bracket 46 is lowered, and the tine in question is lifted from the U-shaped portion 60. A new tine is placed with the connecting portion 52 resting in the U-shaped portion 60. The holes in the bracket 46 and the tine bar 28 are then aligned, and the bolts 58 are inserted through the holes and tightened.

Having described a preferred embodiment of the invention, various modifications within the spirit and scope of the invention will become apparent to those skilled in the art and can be made without departing from the underlying principles of the invention. Therefore, the invention should not be limited to the specific embodiment described and illustrated, but should be commensurate with the proper scope of the following claims.

What is claimed is:

1. In a spring tooth harrow adapted for forward movement over the ground, a generally transverse tine bar having a front flange; a double-coil spring tine including a pair of coils, a connecting portion defining a generally transverse axis and holding the coils in transversely spaced relationship, and a working tooth extending downwardly from the outer portion of each said coil; means pivotally connecting the spring tine to the front flange of the tine bar for swinging freely about the transverse axis between an operating position wherein the working teeth extend generally downwardly from the tine bar, the coils are in contact with the flange and the transverse axis is generally forwardly of the coils below the area of contact of the coils with the front flange, and a free return position wherein the teeth extend forwardly from the bar and the coils are below the axis and free from contact with the front flange.

2. The invention as set forth in claim 1 wherein the means pivotally connecting comprises a bracket releasably secured to the front flange of the tine bar.

3. The invention set forth in claims 1 or 2 wherein the spring tine further includes a forward portion extending forwardly from each said coil on the side thereof opposite the working tooth, each forward portion connecting the corresponding coil with the transverse connecting portion and offsetting the transverse connecting portion radially outwardly and generally forwardly of the coils when the tine is in the operating position such that when the tine is biased rearwardly as it is moved forwardly over the ground in the operating position the forward portion is placed in tension between the coil and the means pivotally connecting the tine to the tine bar.

4. In a spring tooth harrow, a tine bar having a forward flange and adapted for forward movement over the ground; a flexible double-coil spring tine including a pair of coils, each with a generally straight earthworking tooth extending tangentially therefrom, a transverse connecting portion extending between the coils and defining a traverse axis, said connecting portion joining the coils together; a bracket member pivotally connecting the spring tine to the forward flange for swinging about said transverse axis, which axis is fixed with respect to said flange between an operating position wherein the teeth extend generally downwardly from the tine bar and the coils contact the flange to limit free swinging of the tine in one pivotal direction beyond the operating position, and a free return position wherein the teeth extend generally in a forward direction from the tine bar and the coils are pivoted in the opposite pivotal direction about the transverse axis away from contact with the flange, wherein the ends of the connecting portion are placed in tension as the teeth members are flexed rearwardly while the tine is in the operating position.

5. The invention as set forth in claim 4 wherein the bracket member is connected to the forward flange.

6. In a ground-working implement, a flexible double-coil spring tine including a pair of axially aligned coil members, earth-working teeth extending tangentially from the outermost section of each said coil member, a forwardly extending portion extending tangentially from the innermost section of each said coil member, a transverse connecting portion having an axis extending parallel to the axis of the coil members and connected to each said forwardly extending portion for transversely spacing the coil members, a tine bar having a front flange and including a forwardly facing lip extending generally horizontally from the front flange, a bracket releasably securing the tine to the front flange and including a lower U-shaped portion extending below the lip and forming a channel with the lip in which the transverse connecting portion is secured for pivoting about its axis, the forwardly facing lip cooperating with the U-shaped portion to generally fix the pivotal axis with respect to the flange and prevent the tine from coming out of the bracket, wherein the tine is free to pivot in the bracket about the axis between an operating position wherein the teeth extend downwardly and the coil members are pivoted against the flange, and a free return position wherein the coil members are pivoted out of contact with the flange below the bracket and the working teeth extend forwardly of the tine bar, wherein when the tine is in the operating position the forwardly extending portions are maintained in tension as the teeth are flexed rearwardly from their downwardly extending position.

* * * * *